May 3, 1966 B. ECK ETAL 3,249,292
CROSS-FLOW FLUID MACHINES AND CONTROL MEANS
Original Filed Sept. 5, 1962 4 Sheets-Sheet 1
FIG.1.
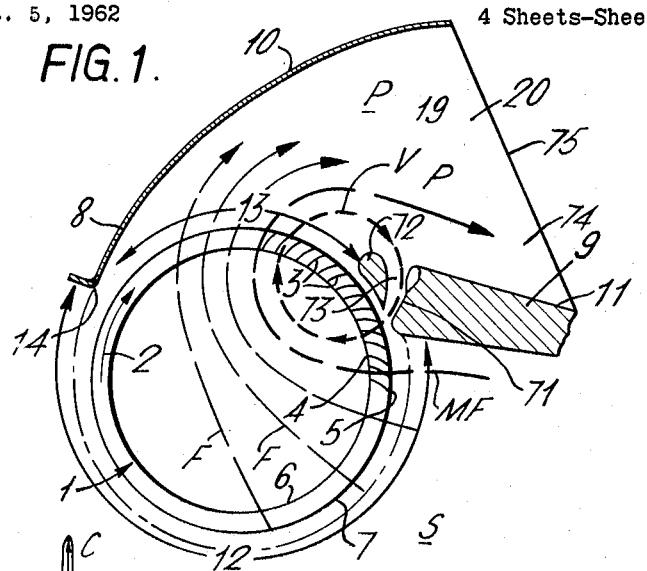
FIG.2.
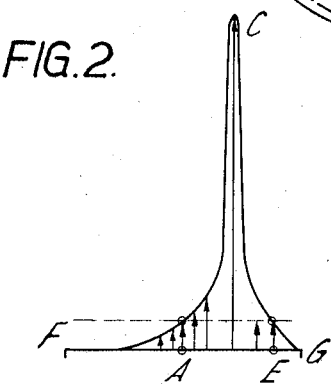
FIG.4.
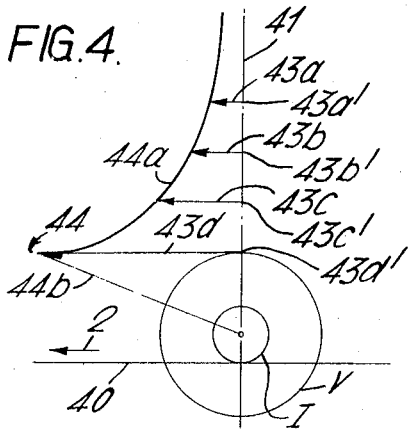
FIG.3.
FIG.5.
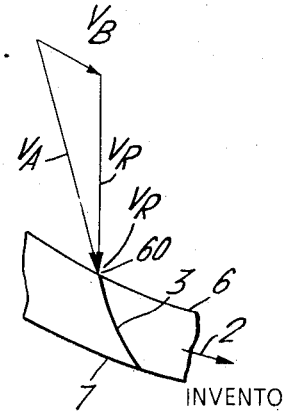
FIG.6.
INVENTORS
BRUNO ECK
NIKOLAUS LAING
BY
ATTORNEYS INVENTORS
BRUNO ECK
NIKOLAUS LAING
BY
Bennie, Edmonds, Morton,
Taylor & Adams
ATTORNEYS May 3, 1966  B. ECK ETAL  3,249,292
CROSS-FLOW FLUID MACHINES AND CONTROL MEANS
Original Filed Sept. 5, 1962  4 Sheets-Sheet 3
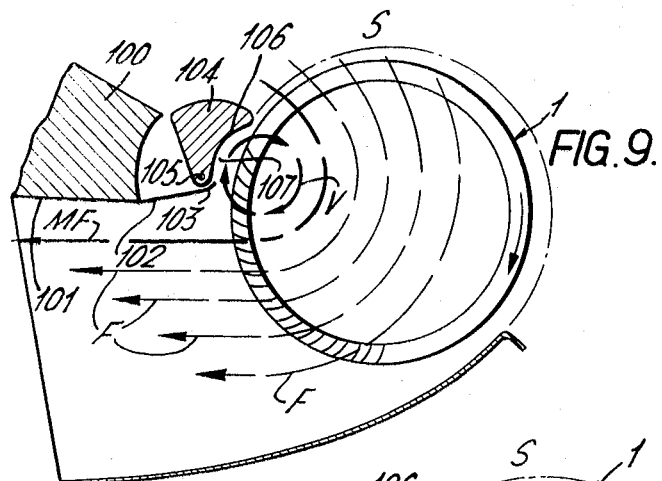
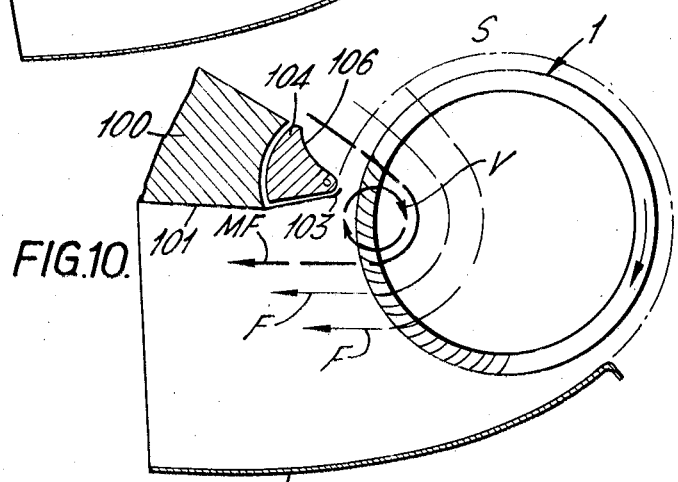
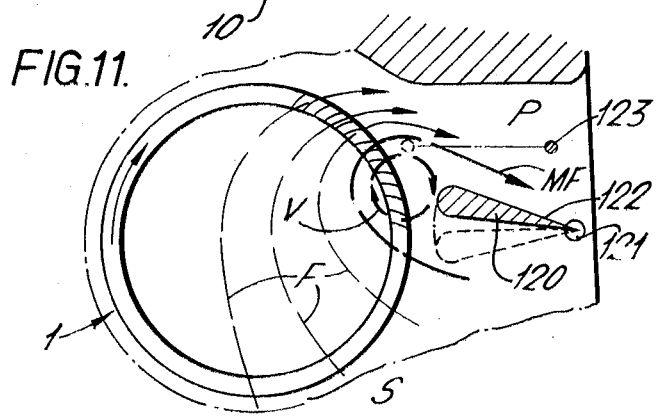
INVENTORS
BRUNO ECK
BY NIKOLAUS LAING
ATTORNEYS

United States Patent Office 3,249,292
Patented May 3, 1966

3,249,292
CROSS-FLOW FLUID MACHINES AND CONTROL MEANS THEREFOR
Bruno Eck, Cologne-Klettenberg, and Nikolaus Laing, Stuttgart, Germany, assignors, by mesne assignments, to Laing Vortex, Inc., New York, N.Y.
Continuation of application Ser. No. 221,620, Sept. 5, 1962. This application May 5, 1965, Ser. No. 453,458
Claims priority, application Germany, Dec. 7, 1956, L 26,388, L 26,389, E 13,334
12 Claims. (Cl. 230—125)

This invention relates to cross-flow fluid machines for inducing movement of fluids which is to be understood as including both liquids and gases, and this application is a continuation of copending application 221,620 filed September 5, 1962, now abandoned, itself a continuation-in-part of application Serial No. 671,114, filed July 5, 1957 and now abandoned. The invention relates more particularly to cross-flow machines of the type comprising a hollow cylindrical bladed rotor mounted for rotation about its axis and through which, in operation of the machine, fluid passes at least twice through the path of the rotating blades in a direction transverse to the axis of the rotor.

The invention concerns more especially fluid flow machines for operation under conditions of low Reynolds numbers. The Reynolds number of a particular fluid flow condition is a dimensionless number representing the ratio of the product of flow velocity and a characteristic linear dimension of the part under observation to the kinematic viscosity of the fluid. For the purpose of the present application Reynolds number (Re) will be defined as $$Re = \frac{d.c.}{\gamma}$$

where $d$ is the blade depth radially of the rotor, $c$ is the peripheral speed of the rotor, and $\gamma$ is the kinematic viscosity of the fluid, the latter being equal to the quotient of the dynamic viscosity and density. A Reynolds number is considered herein to be low if, as above defined, it is less than $5 \times 10^4$.

From the definition just given, it will be understood that the invention concerns more especially flow machines which are small dimensionally, run at low peripheral speeds, or are intended for use with air or other gas having a low density or used with a fluid having a high viscosity.

It is known that in a flow machine having bladed rotors, an initial acceleration and a subsequent deceleration of the flow occurs in boundary layers on the suction side of each blade as fluid passes over the blade. The higher the viscosity of the fluid in relation to its density or in relation to the relative velocity between the blade and fluid (i.e. the lower the Reynolds number) the greater is the deceleration of the boundary layer in the deceleration zone of the blade. If the boundary layer is slowed down sufficiently it separates from the blade and no longer follows the blade contour. The point at which separation occurs is known as the separation point. The separation point travels forward along the surface of the blade against the direction of flow in proportion to the increase in the effect of the viscosity relative to density or to the decrease in the relative velocity between the fluid and the blade.

The movement forward of the separation point along the blade because of low Reynolds number conditions produces a number of undesirable effects in the type of flow machine described. A vorticity zone in which the kinetic energy of the fluid is converted into thermal energy is produced after the separation point with the result that the efficiency of the machine drops. The degree of deflection of the fluid in passing through the path of the rotating blades decreases owing to the fact that the flow does not follow the full extent of the blade profile. This results in less pressure gain in the machine since pressure gain is determined by the extent of the deflection of the stream tubes in the blade channel. Finally, the turbulent flow in back of the separation point effectively reduces a part of the cross-section of the blade channels so that the throughput through the rotor of the machine also diminishes.

For the reasons given, it has previously been considered that the operation of flow machines under conditions of low Reynolds numbers would necessarily and inescapably involve low efficiencies in comparison with efficiencies obtainable under conditions of high Reynolds numbers. For example, although the inefficiency of the small blowers above referred to has been notorious, it has been tolerated simply because it has not hitherto been thought capable of improvement.

It has hitherto been thought that to avoid mixing losses a flow machine should always be designed to have a rectangular velocity profile at every section taken across the flow, that is, the graph of velocity of fluid flow at a given point plotted across the flow channel should rise rapidly from zero at one side of the channel to a steady value maintained over the greater part of the section and should then drop again rapidly to zero at the other side. It has also been assumed hitherto that a flow machine of the type described should always have the blades loaded approximately equally by the fluid in the circumferential zones where the fluid passes through the rotor blades. These two related conditions can normally be satisfied without much difficulty.

Following the principles hitherto generally adhered to in the art and enunicated above, one skilled in the art would normally prefer to design a cross-flow type blower, such as that shown in Patent No. 2,742,733, so as to work under conditions of high Reynolds numbers and would design the blade angles and ducting on the basis of, and with a view to producing a rectangular velocity profile throughout the blower and an equal loading on the rotor blades in the circumferential zones where the fluid passes these rotor blades. On the other hand, if operation at low Reynolds numbers could not be avoided, the same design principles would normally be applied and the resulting lower efficiency regarded as inevitable.

An object of the present invention is to provide a cross-flow machine capable of operating under conditions of low Reynolds numbers with better efficiency than has hitherto been regarded as acceptable.

The invention depends in part on the appreciation that contrary to what has previously been thought by those skilled in the art, it can be advantageous under flow conditions of low Reynolds numbers to bring about in a flow machine a velocity profile having a pronounced maximum with a consequent very unequal loading of the blades in the circumferential zones through which fluid passes. This velocity profile with a pronounced maximum gives rise to some flow tubes within the blower having much greater velocity than the other flow tubes within the blower.

In the restricted circumferential zones of the rotor blades through which the high velocity stream tubes pass, correspondingly high relative velocities exist locally between the fluid and the blades, so that in these zones momentum is imparted to the fluid at efficiencies which could otherwise be obtained only with machines operating under conditions of correspondingly much higher Reynolds numbers. The velocity profile with a pronounced maximum leads to lower velocities than the mean velocity in other circumferential zones of the rotor blades and in these zones transfer of momentum occurs at an efficiency which is lower than it would have been had the velocity profile been rectangular. However, the available momentum in a stream tube issuing from the blades increases with the square of its velocity; thus the momentum of the fluid as a whole is substantially concentrated in the high velocity stream tubes so that the transfer efficiencies in the zones of slow throughflow have little effect on the over-all efficiency.

The invention depends in part also on the appreciation that the above-mentioned velocity profile with a pronounced maximum can be obtained by setting up in the machine a cylindrical vortex including a field region with a velocity profile approximately that of a Rankine vortex and a core region eccentric to the rotor axis. A further object of the invention therefore is to provide various means for forming the vortex and for varying the positions and strength of the vortex in order to vary the output of the machine.

Broadly, a cross-flow machine constructed according to the invention comprises a hollow cylindrically bladed rotor mounted for rotation about its axis and having its interior clear of stationary guides and with the blades of the rotor being curved with their outer edges leading their inner edges. End wall means for substantially closing the ends of the rotor may be provided along with vortex forming means extending the length of the rotor which, when the machine is operated, will form and stabilize a substantially cylindrical fluid vortex having a core interpenetrating the paths of the rotating blades and a field region approximating that of a Rankine vortex whereby a major part of the flow passing through the machine will pass through the path of the rotor blades where they have a component of direction opposite to the main direction of flow within the rotor. Guide wall means may be provided whereby the flow of fluid at the pressure side of the rotor may be directed in a desired direction.

The invention includes also vortex control means for varying the position or intensity of the vortex to vary throughput of the machine. The control means in several of the embodiments include means for varying the vortex, means controlling the flow of fluid forming the vortex, or means changing the position of the vortex with respect to the outlet of the machine.

Referring to the drawings in which several embodiments of the invention are illustrated.

FIGURE 1 is a cross-sectional view of a fluid flow machine constructed according to the invention;

FIGURE 2 is a graph illustrating velocity of fluid flow at the outlet of a cross-flow fluid machine constructed according to the invention;

FIGURE 3 is a graph illustrating velocity of fluid flow at the outlet of conventional cross-flow machines;

FIGURE 4 is a graph illustrating velocity of fluid flow within the field of a Rankine type fluid vortex;

FIGURE 5 illustrates the ideal fluid flow lines occurring in one half the cross-sectional area of a rotor of a machine of the type shown in FIGURE 1;

FIGURE 6 is a vector diagram illustrating flow of fluid contacting a blade on its second transversal of the path of the rotating blades or when the fluid passes from the interior of the rotor to the pressure side of the machine;

FIGURE 9 is a cross-sectional view of a machine somewhat similar to FIGURE 1 illustrating a control means for changing the position of a vortex core to control throughput where the control means is in a low performance position;

FIGURE 10 is a cross-sectional view similar to FIGURE 9 showing the relation of the parts when the performance is high;

FIGURE 11 is a cross-sectional view of a machine having a pivotable guide body which besides providing a means for varying the position of the vortex core provides in addition a variable diffuser means and a means for spoiling the vortex;

Figure 7:
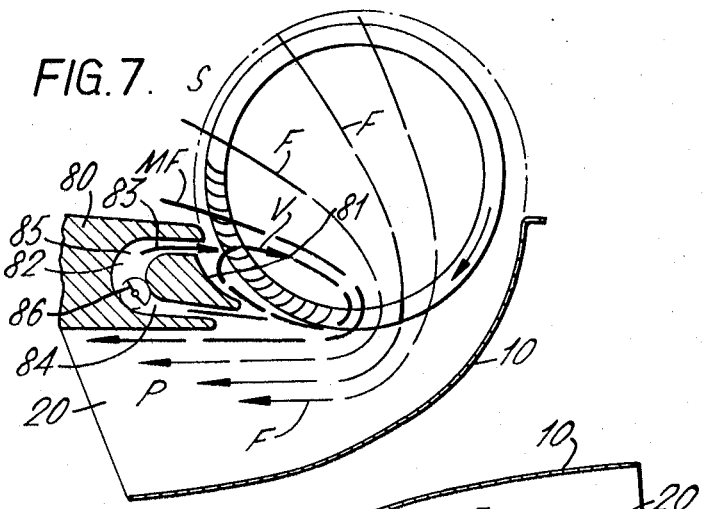
FIGURE 7 is a cross-sectional view of a machine somewhat similar to that shown in FIGURE 1 showing another form of control means for varying the intensity of a vortex.

Reference is made to the figures wherein like parts have like identifying numerals and, in particularly to FIGURE 1 which illustrates a flow machine having a cylindrically bladed rotor 1 which is mounted, by means not shown, for rotation about its axis in the direction of the arrow 2. The rotor 1 has thereon blades 3 extending longitudinally thereof and having inner and outer edges 4 and 5 lying on inner and outer blade envelopes 6 and 7 formed when the rotor is rotated. The blades 3 are concave facing the direction of rotation and have their outer edges leading their inner edges.

A guide wall means 8 extends the length of the rotor and merges with a wall 10 to form one side of an exit duct of the machine. A vortex forming means designated generally 9 and well spaced from the rotor also extends the length of the rotor and has thereon a wall 11 which forms part of the exit duct and more particularly which forms a diffuser section 19. End walls 20, only one of which is shown, cover the ends of the machine and may, although not necessarily, close the ends of the rotor. The wall 8 and vortex forming means 9 define entry and exit arcs 12 and 13 for flow of fluid to and from the rotor. Thus the wall 8 and the vortex forming means 9 provide an arc for entry of fluid into the rotor which in this embodiment is substantially greater than 180°, though this is by no means essential.

The vortex forming means 9 divides the suction region S from the pressure region P. The vortex forming means 9 has a wall portion 71 on the exit side of the rotor converging towards the rotor in the direction of rotation to form a converging gap. An auxiliary body 72 defines a channel 73 with the wall 71 and the channel has a movable flap 74 to control flow therethrough. The flap 74 is pivoted about the axis 75 so that the flap may completely or partially close the channel 73.

The wall 8 terminates at 14 which is spaced from the rotor a minimum of one-half the blade depth and not more than three times the blade depth in order to minimize interference which causes an undesirable noise when the machine is operated, while at the same time providing a means to guide the flow leaving the machine. The zone 14 defines one end of both the entry arc 12 and the exit arc 13. From the zone 14, the wall 8 diverges steadily from the rotor in the direction of rotation indicated by the arrow 2 with increasing radius of curvature; remote from the rotor the wall may be straight. The pressure region P accordingly consists of a channel the median line of which is of spiral form.

It is preferred that not only the wall 8 but also the vortex forming means 9 separating the pressure and suction sides of the machine should be substantially spaced from the rotor; the machine can then be made without adhering to close manufacturing tolerances, while still effectively separating the pressure and suction sides and maintaining the relatively high efficiency of the machine. A machine constructed according to the invention and having such spacing lends itself readily to sheet metal construction.

In operation of the FIGURE 1 machine, a vortex having a core whose periphery is defined by the stream line V and approximating a Rankine vortex is produced wherein the core is positioned eccentrically to the rotor axis. The whole throughput of the machine flows twice through the blade envelope in a direction perpendicular to the rotor axis as indicated by the flow lines F, MF.

FIGURE 4 illustrates an ideal relation of the vortex to the rotor 1 and the distribution of flow velocity in the vortex core and in the field of the vortex. The line 40 represents a part of the inner envelope 6 of the rotor blades 3 projected onto a straight line while the line 41 represents a radius of the rotor taken through the axis of the vortex core. Velocity of fluid at points on the line 41 by reason of the vortex is indicated by the horizontal lines 43a, 43b, 43c and 43d, the length of these being the measure of the velocity at the points $43a^1$, $43b^1$, $43c^1$ and $43d^1$. The envelope of these lines is shown by the curve 44 which has two portions, portion 44a being approximately a rectangular hyperbola and the other portion, 44b, being a straight line. Curve 44a relates to the field region of the vortex and the curve 44b to the core. It will be understood that the curve shown in FIGURE 4 represents the velocity of fluid where an ideal or "mathematical" vortex is formed, and that in actual practice, flow conditions will only approximate these curves.

The core of the vortex is a whirling mass of fluid with no translational movement as a whole and the velocity diminishes from the periphery of the core to the axis 42. The core of the vortex intersects the blade envelope as indicated at 40 and an isotach I within the vortex having the same velocity as the inner envelope contacts the envelope. The vortex core is a region of low pressure and the location of the core in a machine constructed according to the invention can be determined by measurement of the pressure distribution within the rotor.

The velocity profile of the fluid where it leaves the rotor and passes through the path of the rotating blades will be that of the vortex. In the ideal case of FIGURE 4, this profile will be that of the Rankine vortex there shown by curves 44a and 44b, and in actual practice, the profile will still be substantially that shown in FIGURE 4 so that there will be around the periphery V of the core shown in FIGURE 1 a stream tube of high velocity whose centre line is the stream line MF, and the velocity profile taken at the exit arc 13 will be similar to that shown in FIGURE 2 where the line FG represents the exit arc 13 and the ordinates represent velocity. The curve shown exhibits a pronounced maximum point C which is much higher than the average velocity represented by the dotted line.

It will be appreciated that much the greater amount of fluid flows in the flow tubes in the region of maximum velocity. It has been found that approximately 80% of the performance is concentrated in the portion of the output represented by the line AE which is less than 30% of the total arc 13. A conventional velocity profile for fluid flow in a defined passage is illustrated by the way of contrast in FIGURE 3 where the average velocity of flow is represented by the dotted line. Those skilled in the art regard this profile as being approximately a rectangular profile which following the principles generally adhered to is the sort of profile heretofore sought in the outlet of a flow machine.

The maximum velocity C shown in FIGURE 2 appertains to the maximum velocity stream tube. With a given construction the physical location of the flow tube MF may be closely defined. The relative velocity between the blades and fluid in the restricted zone of the rotor blades 3 through which the maximum velocity stream tube passes in much higher than it would be if a flow machine were designed following the conditions adhered to heretofore in the art respecting the desirability of a rectangular velocity profile at the exit arc and even loading of the blades.

Under low Reynolds number conditions, this unevenness of the velocity profile leads to beneficial results in that there will be less separation and energy loss in the restricted zone of the rotor blades through which the high velocity stream tubes pass than if these stream tubes had the average velocity of throughput taken over the whole exit arc 13 of the rotor. There is a more efficient transfer of momentum to the fluid by the blades in this restricted zone and while the transfer of momentum in the flow tubes travelling below the average velocity will be less efficient, nevertheless when all of the flow tubes are considered, there is a substantial gain in efficiency.

FIGURE 5 illustrates ideally a number of stream lines F characterizing stream tubes occurring within one half the rotor area defined by the inner envelope 6, it being understood that the stream tubes in the other half of the rotor are similar. The centre line MF of the stream tubes of highest velocity is shown intersecting the envelope 6 at point 50 and the isotach I as being circular when the whole rotor is considered. It is seen that ideally the stream tubes of highest velocity undergo a change of direction of substantially 180° from the suction to the pressure sides when the flow in the whole rotor is considered. It is also to be noted that the major part of the throughput, contained in these stream tubes, passes through the rotor blades where the blades have a component of velocity in direction opposite to the main direction of flow within the rotor indicated by the arrow A.

FIGURE 6 is a diagram showing the relative velocities of flow with respect to a blade at the point 50 referred to in FIGURE 5. In this figure $V_B$ represents the velocity of the inner edge of the blade 3 at the point 50, $V_A$ the absolute velocity of the air in the flow tube MF at the point 50, and $V_R$ the velocity of that air relative to the blade as determined by completing the triangle. The direction of the vector $V_R$ coincides with that of the blade at its inner edge so that fluid flows by the blade substantially without shock.

The character of a vortex is considered as being determined largely by the blade angles and curvatures. The position of the vortex, on the other hand, is considered as being largely determined by the configuration of the vortex forming means which forms and stabilizes a vortex in cooperation with the bladed rotor. The particular angles and curvatures in any given case depend upon the following parameters: the diameter of the rotor, the depth of a blade in a radial direction, the density and viscosity of the fluid, the disposition of the vortex forming means and the rotational speed of the rotor, as well as the ratio between overall pressure and back pressure. These parameters must be adapted to correspond to the operating conditions in a given situation. Whether or not the angle and shape of the blades have been fixed at optimum values is to be judged by the criterion that the stream tubes close to the vortex core are to be deflected approximately 180°.

It is to be appreciated that the flow lines of FIGURE 1 do not correspond exactly to the position of the vortex core as illustrated in FIGURES 4 and 5 which represent the theoretical or mathematical flow. These latter figures show that it is desirable to have the axis of the core of the vortex within the inner blade envelope 6 so that the isotach within the core is tangent to that envelope. Although this position is achieved in certain constructions hereinafter described, it is not essential, and in fact, is not achieved in the structure shown in FIGURE 1.

It is further to be appreciated that despite the divergence of the flow in FIGURE 1 from the ideal, the stream tubes of highest velocity which carry a major part of the throughput are nevertheless turned through an angle of substantially 180° in passing from the suction to the pressure side of the rotor and that these stream tubes pass through the rotor blades where the blades have a velocity with a component opposite to the main direction of flow through the rotor as indicated by the arrow A.

The throughput of the cross flow machine constructed according to the invention and illustrated in FIGURE 1 may be varied by adjusting the flow in the channel 73 by means of the flap 74. When flap 74 is held up against the wall 71 as illustrated, it does not effect fluid passing the channel forming the vortex. However, if the flap is moved to close channel 73 or is moved to intermediate positions to throttle the channel in varying degrees, fluid flow forming the vortex core will be varied. As the intensity of the vortex core decreases, the velocity of the flow tube MF will decrease thus decreasing the throughput of the machine. If the flap 74 is moved to completely throttle the channel 73, the vortex core will move against the direction of rotation and will block a substantial portion of the exit arc.

The structure shown in FIGURE 7 illustrates a further means for regulating throughput of a flow machine constructed according to the invention by controlling the amount of fluid that may be recirculated back from the exit side of the machine through the vortex forming and stabilizing means to the suction side of the machine. The vortex forming means 80 comprises a wall portion 81 conforming to the rotor curvature but appreciably spaced therefrom. The means 80 has a U shaped passage 82 through which fluid at high velocity is removed from the periphery of the vortex core at the exit side of the machine and reinjected towards the inlet side as indicated by arrow 83. The passageway 82 is formed as a diffuser section 84 where the velocity energy of the entering fluid is converted in part to static pressure. The diffuser in turn is followed by a nozzle section 85. The diffuser section 84 contains a butterfly valve 86 to control the quantity of fluid flowing through the passageway which in turn affects the intensity of the vortex core and hence the throughput of the machine. Little force is required to effect regulation as the valve 86 is balanced. The formation of a diffuser in the passageway followed by a nozzle reduces fluid losses occurring in the bend of the passageway.

Figure 8:
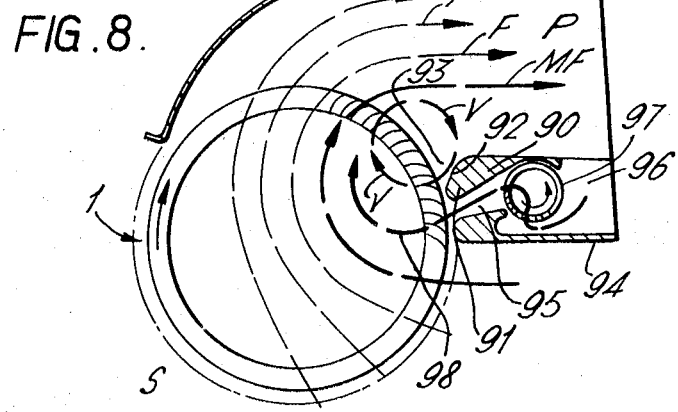
FIGURE 8 is a cross-sectional view of a machine somewhat similar to that shown in FIGURE 1 illustrating still another control means for varying the intensity of a vortex.

FIGURE 8 illustrates still a further means of varying throughput of a cross flow machine constructed according to the invention by controlling the amount of fluid that may be recirculated back from the exit to the inlet sides of the machine. The vortex forming and stabilizing means 90 there shown comprises a main body 91 having a wall 92 on the exit side of the rotor 1 which converges toward the rotor in the direction of rotation to define a converging gap 93. A second body 94 on the entry side of the body 91 defines a passage 95 leading towards the rotor from a chamber 96 in which a small auxiliary bladed rotor 97 is mounted for rotation. The chamber 96 communicates with the outlet side of the body 91. The auxiliary rotor 97 and the walls of the body 91 and 94 cooperate to form in miniature a flow machine of the type illustrated in FIGURE 1. By mechanically driving the auxiliary rotor 97, a high velocity fluid stream 98 will be caused to flow through passage 95 to join tangentially with the peripheral stream tubes of the voretx core, with the effect that these latter tubes are accelerated, thus increasing intensity of the vortex core. Flow through the machine is thus controlled by adjusting the speed of the auxiliary rotor which in turn varies the intensity of the vortex core.

Fluid throughput of a cross flow machine constructed according to the invention may also be regulated by moving a portion of the vortex forming and stabilizing means in order to change the position of the vortex core with respect to the outlet wall 8 and 9 and vortex stabilizing means as shown in FIGURE 1. In the construction shown in FIGURE 9, the vortex forming and stabilizing means comprises generally a body 100 having a wall portion 101 defining a side of the exit duct to the machine. Wall 101 is continued beyond the body 100 towards the rotor by an extension 102 formed of a sheet-like material of which the free end portion 103 is spaced from the rotor and generally curled in the direction of rotation. An auxiliary body 104 which is substantially triangular cross-sectioned is pivoted along one end of the wall 102 behind the curled portion 103 at the entry side thereof, the pivot axis being indicated at 105. The body 104 has a concave side 106 opposite the rotor. In the position shown in FIGURE 9, the concave side 106 converges towards the rotor in the direction of rotation by way of continuation of the curled end portion 103 of the wall 102 thus forming a converging gap 107 which, when the machine is operated, will form and stabilize a vortex. When the auxiliary body 104 is moved to the position shown in FIGURE 10 so that it is positioned behind the wall 102 and is inoperative, the vortex core is displaced towards the outlet of the machine and depends upon the curled portion 103 of the wall 102 for its formation. In the position shown in FIGURE 10 the vortex, being smaller, is intensified so that the throughput of the machine is greater whereas in the position shown in FIGURE 9, the vortex is larger with the result that the machine is quieter and the throughput is less.

The machine shown in FIGURE 11 illustrates a still further means for varying the position of the vortex in order to change the throughput. In this structure, the machine is provided with a pivotable vortex forming and stabilizing means 120 shaped as a thin sector having its larger end rounded and having its other end pivoted for movement about the axis 121. The vortex core is formed in the same manner as in FIGURE 1. When the means 120 takes the position shown in full line, the core takes the position shown. When the body 120 is pivoted to the dotted position, the core is moved downwardly, thus changing the throughput of the machine.

The arrangement shown in FIGURE 11 also provides a means whereby a diffuser may be formed in one position of the vortex forming means and where there will be no diffuser effect when the means is in another position. The means 120 has a wall 122 which, when the means 120 is in the position shown in full lines, will act as an outlet wall diverging from the wall 10 in the direction of flow so that a diffuser is formed. When the means 120 is in the position shown in dotted lines, the walls 122 and 10 are substantially parallel so there is no diffuser effect at the outlet.

The throughput of a machine constructed according to the invention may be further regulated between maximum and minimum by spoiling the vortex formed. In the structure shown in FIGURE 11, a rod 123 extends parallel to the rotor along its length and is movable between the position shown in full lines and that shown in dotted. In the full line position the rod has negligible effect on flow of fluid forming the vortex. However, when the rod is in the dotted line position, the rod interferes with the flow of fluid forming the vortex so influencing the vortex to decrease the throughput of the machine.

Figure 12:
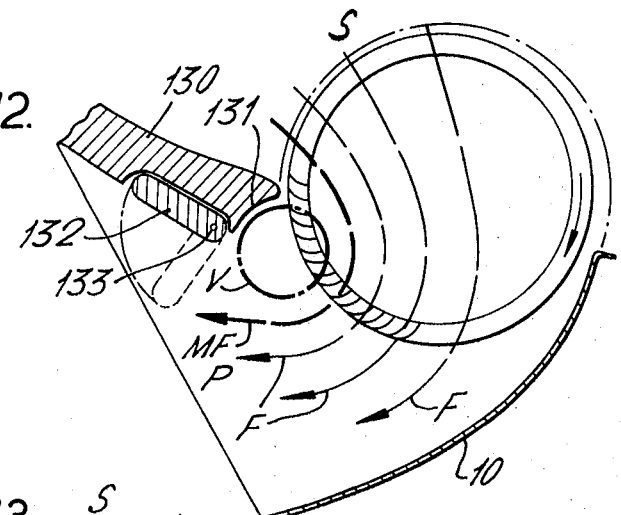
FIGURE 12 is a cross-sectional view of a machine somewhat similar to FIGURE 1 whereby the position of the vortex core and resulting performance is controlled by varying the flow in the outlet of the machine.

The structure shown in FIGURE 12 illustrates a further means of varying the position of the vortex in order to regulate throughput. In that machine, the vortex forming and stabilizing means 130 has a wall 131 converging towards the rotor to form a converging gap. A pivotable member 132 is pivoted to rotate about the axis 133 and is capable of assuming any position between that shown in full lines and dotted lines. The pivoted member is placed on the outlet side of the machine so that when the member is in the position shown in dotted lines, the vortex will be moved downwardly and enlarged to decrease the throughput of the machine.

Figure 13:
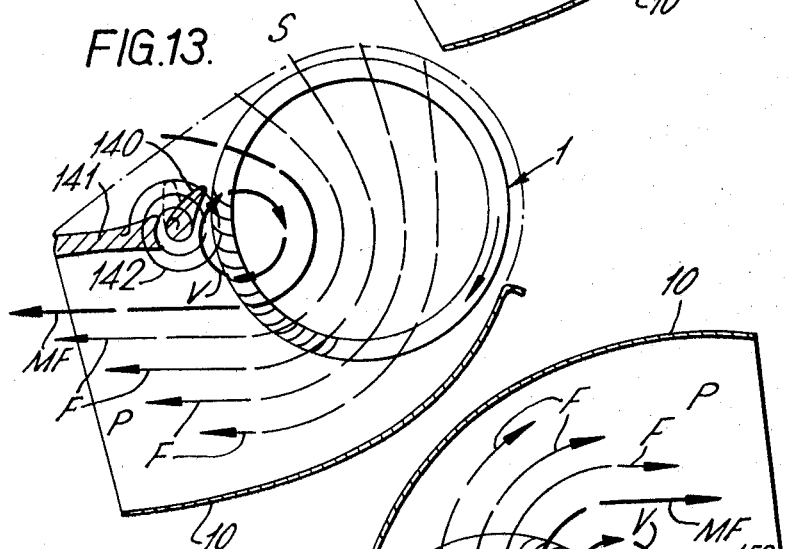
FIGURE 13 is a cross-sectional view of a machine somewhat similar to FIGURE 1 whereby a change in position of the vortex core and resulting performance may be made periodically.

The structure in FIGURE 13 includes a vortex forming and stabilizing member 140 which is pivotably connected to a body member 141 and which is urged by a resilient spring 142 in one direction and by the force of the fluid flow acting on the member in the other direction. The effect of this arrangement is that the member 140 will move cyclically, thus varying the throughput of the machine cyclically.

Figure 14:
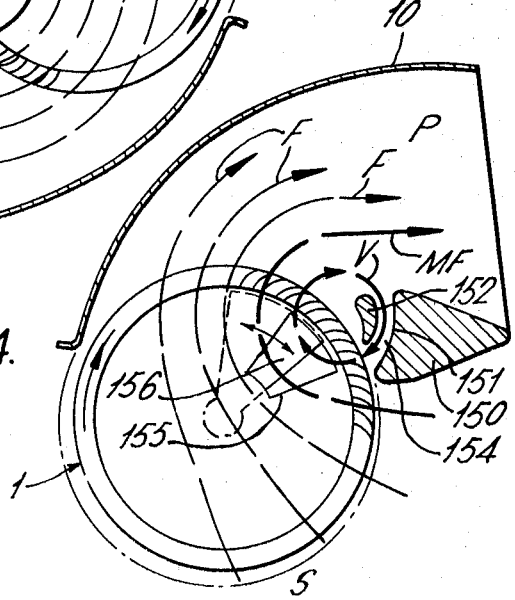
FIGURE 14 is a cross-sectional view of a machine illustrating a means for spoiling the vortex whereby performance may be controlled.

The throughput of a machine constructed according to the invention may further be regulated by varying the pressure within the vortex core whereby a rise of pressure within the core decreases its intensity and whereby, if the pressure is raised sufficiently, the vortex core is completely spoiled. The construction illustrated in FIGURE 14 shows a means whereby the pressure within the vortex core may be regulated. In the machine there illustrated, the vortex is formed with a vortex forming and stabilizing means 150 having the same general configuration as that shown in FIGURE 1, where the means 150 has a wall portion 151 extending and curving towards the rotor to define a converging gap. In addition, the means 150 is provided with an auxiliary body 152 which defines with means 150 a channel 154 through which flow may pass from the outlet side of the machine back into the rotor in order to form the vortex core shown. In addition, the end wall 20 closing one end of the rotor has an aperture 155 in the region where the vortex core is formed. The apareture 155 has the shape of a truncated sector which is adapted to be closed by a sector shaped coverplate 156 pivoted about an axis coinciding with the rotor axis. When the aperture 155 is completely opened, fluid enters through it from the exterior of the machine and spoils the vortex thus reducing the throughput of the machine.

The embodiment shown in FIGURE 14 is particularly useful for controlling throughput of machine having short rotors; however, it is not as effective in machines using long rotors. Where the rotor is relatively long, it is not absolutely necessary that its ends be completely closed in order that a vortex be formed. In a long rotor having its ends open, the vortex formed may be spoiled adjacent the rotor ends by axial inflow of fluid into the rotor; however, the vortex will continue to exist over a major portion of the length of the rotor to give the uneven velocity profile that is a characteristic of crossflow machines constructed as disclosed above.

Figure 15:
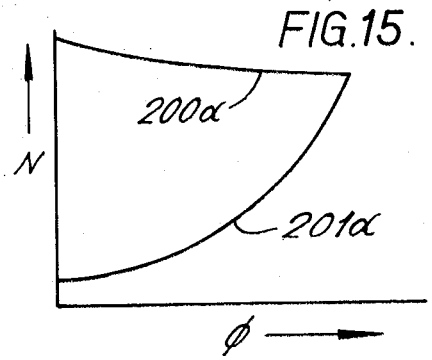
FIGURE 15 is a graph illustrating power required where an axial blower is throttled as compared with a fluid machine constructed according to the invention.

Flow machines constructed according to the invention have normally a very low power consumption when the throughoput is low, as contrasted with conventional flow machines. This may be seen by referring to FIGURE 15 which represents a "throttling curve" or a curve of power consumption N against throughput. The curve 200a relates to an axial flow machine of a conventional design while the curve 201a relates to a machine such as that shown in FIGURE 1. It is seen that as the machine constructed according to the invention is throttled to reduce throughput, that power required to rotate the rotor also reduces, while the power required to operate the axial flow machine actually increases at low throughput. In some instances, when using machines constructed according to the invention, it may be desired that the power consumption of the machine be constant regardless of the throughput: this requirement may be particularly important if the machine is combined with other machines control of which varies with power requirements. This may be achieved in a machine constructed according to the invention by utilizing the structure as shown in FIGURE 14 and by opening the aperture 155. The power thus consumed by the machine will remain substantially the same with the throughput being controlled entirely by varying the pressure within the vortex core.

While the several forms of machine described are particularly adapted for use under low Reynolds number conditions, their construction may also be used under high Reynolds number conditions; however, they are considered particularly adaptable for low Reynolds number conditions wherein rotor type fluid flow machines have been notoriously inefficient.

We claim:

1. A cross flow fluid machine of the type comprising a hollow cylindrical bladed rotor mounted for rotation about its axis; end walls substantially enclosing the ends of said rotor; guide wall means extending the length of said rotor and forming a side wall of an exit duct from said machine; vortex forming and stabilizing means exterior of said rotor for forming a substantial cylindrically shaped fluid vortex when said machine is operated extending the length of the rotor having a core interpenetrating the path of the rotating blades whereby fluid is made to flow from a suction side of said machine into the rotor through the path of the rotating blades and thence out of the rotor through the path of the rotating blades to the exit duct in a plane transverse to the rotor axis, and whereby said vortex forming and stabilizing means separates the suction side of said machine from a pressure side thereof; and vortex control means for varying the intensity of said vortex whereby the throughput of fluid through said machine may be regulated.

2. A fluid machine, according to claim 1, wherein said vortex forming and stabilizing means has therein a passage through which a portion of the vortex core passes and wherein said control means comprises a closure means for closing said passage to regulate the flow of fluid forming said vortex core and resultant intensity of said core.

3. A fluid machine according to claim 1 wherein said vortex forming and stabilizing means has therein a passage extending from the outlet of said machine to a portion of the rotor adjacent said inlet and wherein said passage has therein a diffuser section and a nozzle section separated by valve means whereby fluid passing through said passage from the outlet of said machine and injected into said rotor adjacent the inlet of said machine may be regulated to vary the intensity of the vortex core formed.

4. A fluid flow machine according to claim 1 wherein said vortex forming and stabilizing means includes a passageway extending from the outlet of said machine to the rotor adjacent said inlet and wherein said passageway has therein a mechanically driven auxiliary bladed rotor whereby fluid may be made to flow from said inlet through said passage and through the rotor to tangentially join with the periphery of the fluid forming the vortex core whereby by varying the speed of said auxiliary rotor, the intensity of the core will be varied to regulate throughput through said machine.

5. A fluid machine according to claim 1 wherein said vortex control means comprises means for influencing said vortex whereby the throughput of said machine may be regulated.

6. A fluid machine according to claim 5 wherein said means comprises a rod extending the length of said rotor position in the exit of said machine and movable to and from a position wherein it intercepts and influences flow of fluid forming the core of said vortex.

7. A fluid machine according to claim 5 wherein said means comprises a movable flap positioned on said vortex forming and stabilizing means adjacent said outlet whereby fluid flowing from said outlet back to said rotor to form said core is intercepted by said flap when said flap is moved outwardly into said duct.

8. A fluid machine according to claim 5 wherein said means comprises pressure control means for varying the pressure within the core of said vortex.

9. A cross flow fiuid machine of the type comprising a hollow cylindrical bladed rotor mounted for rotation about its axis; end means substantially closing the ends of said rotor; guide wall means extending the length of said rotor and forming a side wall of an exit duct of said machine; vortex forming and stabilizing means exterior of said rotor for forming a substantially cylindrically shaped fluid vortex when said machine is operated extending the length of the rotor and having a core interpenetrating the path of the rotating blades whereby fluid is made to flow from a suction side of said machine into the rotor through the path of the rotating blades and thence out of the rotor through the path of the rotating blades to the exit duct in a plane transverse to the rotor axis, and whereby said vortex forming and stabilizing means separates the suction side of said machine from a pressure side thereof; and vortex control positioning means for varying the position of said vortex whereby the throughput of fluid through said machine may be regulated.

10. A fluid machine according to claim 9 wherein said vortex forming and stabilizing means has a movable wall portion to vary the position of the core of said vortex with respect to the outlet of said machine whereby throughput of said machine is controlled.

11. A fluid machine according to claim 10 wherein said vortex forming and stabilizing means comprises a movable sector shaped body having its larger end rounded and having its narrower end pivoted about an axis spaced from the rotor axis, wherein one side wall of said sector shaped body serves as a side wall for the exit duct of said machine, and wherein the rounded end of said body forms and stabilizes the vortex core with said rotor when said machine is operated; said body when pivoted about its axis moving said vortex to vary the throughput of the machine and the side wall of said body when said body is in one position exerting a diffuser effect in said exit duct.

12. A fluid machine according to claim 10 wherein said movable wall portion is urged by resilient means in one direction and by fluid forces in the opposite direction whereby the wall portion will oscillate to vary the position of vortex core and to produce an oscillating throughput.

References Cited by the Examiner

UNITED STATES PATENTS 2,942,773 6/1960 Eck _____ 230—133
3,161,348 12/1964 Laing _____ 230—125

FOREIGN PATENTS 586,935 12/1958 Italy.

HENRY F. RADUAZO, *Examiner*.